(No Model.)

A. A. DENTON.
APPARATUS FOR EXPOSING LARGE SURFACES OF LIQUIDS TO AIR OR VAPOR OR GAS.

No. 339,387. Patented Apr. 6, 1886.

ATTEST:

INVENTOR.
Albert A. Denton
By L. Deane
his Atty.

UNITED STATES PATENT OFFICE.

ALBERT A. DENTON, OF BAVARIA, KANSAS.

APPARATUS FOR EXPOSING LARGE SURFACES OF LIQUID TO AIR OR VAPOR OR GAS.

SPECIFICATION forming part of Letters Patent No. 339,337, dated April 6, 1886.

Application filed February 28, 1885. Serial No. 157,398. (No model.)

*To all whom it may concern:*

Be it known that I, ALBERT A. DENTON, a citizen of the United States, residing at Bavaria, in the county of Saline and State of Kansas, have invented certain new and useful Improvements in Apparatus for Exposing Large Surfaces of Liquid to Air or Vapor or Gas, of which the following is a specification, reference being had therein to the accompanying drawings.

The object of this invention is to improve an apparatus for evaporating liquids, for which Letters Patent were allowed me December 23, 1884, No. 309,775.

It consists in modifying the construction of the liquid conveyers or carriers of that apparatus.

It consists, also, in adapting the aforesaid apparatus to use in all cases where it is desirable to expose large surfaces of liquid in thin films, frequently renewed, to the evaporative action or to the chemical action of air or of vapor or of gas, for the purpose of evaporating water or alcohol or other volatile substance and afterward condensing the vapors thus obtained in an apparatus for that purpose, or for the purpose of evaporating the liquid and condensing the substances contained in the liquid or for the purpose of causing the liquid or semi-liquid to absorb any vapor or gas, thus forming solutions, or for the purpose of causing the liquid or semi-liquid to chemically combine with air or any vapor or gas, thus forming other compounds, or for the purpose of cooling liquids.

The object of this invention is to adapt the aforesaid apparatus to other purposes than the evaporation of liquids, and also to improve its construction for evaporating purposes.

Figure 1:
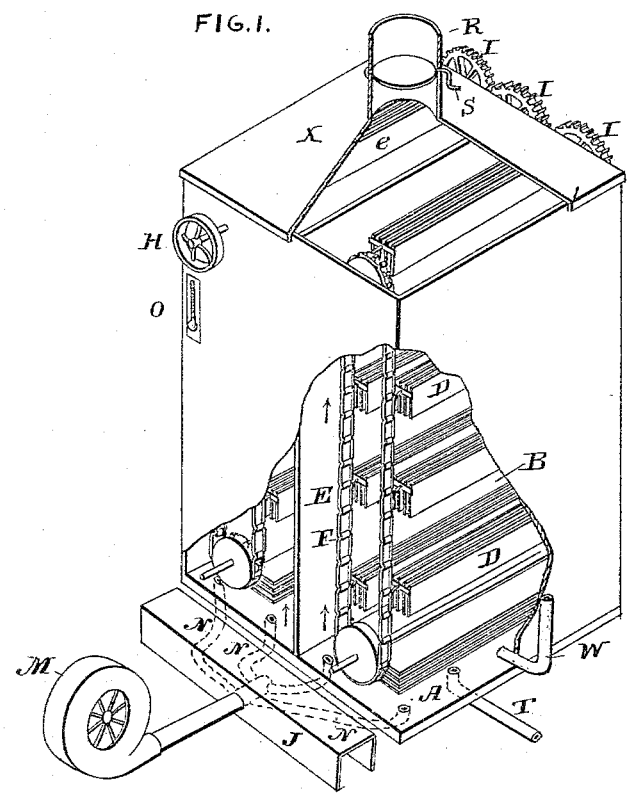
Figure 2:
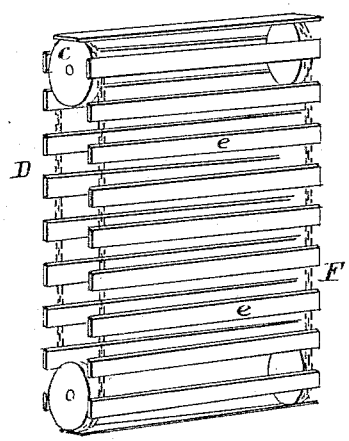

In the accompanying drawings, Figure 1 is a perspective view of the entire device; Fig. 2, a perspective of the evaporating slats and chains. Figs. 3, 4, 5, and 6 are modifications of the latter.

In evaporating liquids by air large surfaces covered with thin films of liquid and frequently renewed should be exposed to the evaporative action of rapid currents of air heated to the proper temperature.

In forming sulphurous-acid solution large surfaces of liquid in thin films, frequently renewed should be exposed to a nearly-confined atmosphere of sulphurous acid gas. In this case the liquid absorbs the gas and becomes a solution.

In carbonating saccharine liquids or other liquids large surfaces covered with thin films of liquid and frequently renewed should be exposed to a nearly-confined atmosphere of carbonic-acid gas. In this case the gas combines with the lime previously added to the liquid and forms the insoluble carbonate of lime, which may then be removed.

In forming the bisulphite of lime large surfaces covered with thin films, frequently renewed, of a mixture of lime and water or whitewash should be exposed to a nearly-confined atmosphere of sulphurous-acid gas. In this case the gas chemically combines with the lime and forms the bisulphite of lime.

In manufacturing vinegar the liquid should have large surfaces exposed to a nearly-confined atmosphere of air at proper temperature. In this case the oxygen of the air chemically changes the liquid and forms new compounds.

In all processes of fermentation large surfaces of liquid exposed to air are essential to quick work, but rapid evaporation should be avoided.

In evaporating an alcoholic liquid by air at low temperature pure alcohol, which needs no refining, is obtained, for the empyreumatic substances do not distil with the alcoholic vapor at such low temperature. In cooling liquids, large surfaces covered with thin films of liquid, frequently renewed, should be exposed to cold air.

I desire to modify the aforesaid apparatus for evaporating liquids, so as to adapt it to the evaporation of water, alcohol, or other volatile substances, which may afterward be condensed in an apparatus for that purpose. I desire to improve it for evaporating liquids for the purpose of condensing the substances in the liquid and obtaining them in a concentrated form. I desire to adapt it to the purpose of forming solutions by causing the liquid to absorb any vapor or gas contained in the chamber which incloses the liquid-conveyers. I desire to adapt it to the purpose of quick fermentation or forming compounds by causing the liquid to chemically combine with the air or vapor or gas contained in the chamber which incloses the liquid-conveyers. I desire to adapt it to the purpose of cooling liquids. To better accomplish these objects I modify the construction of the compound surface-multiplying slats *e e*, and also the method of attachment of the slats to the chains or belts.

In constructing this improved apparatus I use chains or belts. When using vapors or gases which act on metal, or when fermenting liquids, belts of fibrous material are preferable.

Figure 3:
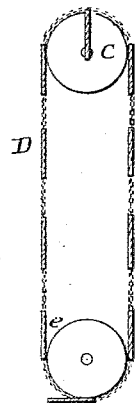
Figure 4:
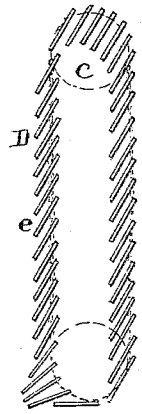
Figure 5:

The simplest form of this apparatus for exposing large surfaces of liquid to air or vapor or gas consists in attaching single strips of suitable material to the chains or belts, these strips being a slight distance apart and attached to the chains or belts rigidly or by pivot attachments, thus forming a single liquid-conveyer, D, as shown in Figs. 2, 3, and 4. Several of these single liquid-conveyers may be connected by the gear-wheels I I I, and thus form a larger apparatus having larger surfaces. For dense semi-liquids this form of liquid-conveyer is preferable. These single strips, when attached to the chains or belts by pivot attachments, may be so attached that their weight causes them to assume a vertical (Fig. 3) or an inclined or angular position (Fig. 4) while passing through the chamber B and while passing over the upper wheels, C C. When thus attached in an angular position they may be more closely and compactly placed, and may overlap each other, as is shown in Fig. 4, and the liquid-conveyer thus formed contains much larger surfaces than is the case when the slats hang vertically or are rigidly attached to the chains or belts.

For attaching single or compound slats to the chains or belts I prefer what is known as "Ewart attachments, D or M," or their equivalent, and place these attachment-links at suitable intervals on the chains or belts. This method of attachment permits the single or the compound slats to be easily attached to or disconnected from the chains or belts for the purpose of cleaning or repairing. It also allows the single or the compound slats *e e* to preserve a vertical or an inclined position, as may be preferred, while passing through the chamber B, and while passing over the upper wheels, C C, as is shown in Figs. 3, 4, 5, and 6, instead of assuming a horizontal or nearly horizontal position while passing over the upper wheels, C C, as is the case when the single or compound slats are rigidly fastened to the chains or belts F F. As these pivot attachments engage with the slats *e e* near their upper edge on each end of the slats, and engage loosely, so that the slats turn loosely upon their pivot attachments, the weight of the slats, being mostly below the point of attachment to the chains or belts, causes the slats to turn upon their pivot attachments, and thus to preserve a vertical or an inclined or angular position while passing through the chamber B, and while passing over the upper wheels, C C, as shown in Figs. 3, 4, 5, and 6. In this position air passes through the slats and out of the chamber B more readily than is the case when the slats assume a horizontal position while passing over the upper wheels, C C, which they do when they are rigidly fastened to the chains or belts, and they then act as dampers on the currents of air passing through the chamber B.

Figure 6:

In constructing the compound surface-multiplying slats *e e*, I take single strips of metal or of wood of suitable width and place them a sufficient distance apart to allow air or gas to pass between them, and fasten several of these strips together with collars or their equivalent between them, to keep the parallel strips the proper distance apart, thus forming one compound surface multiplying slat having a large aggregate surface. I then connect this compound slat with the chains or belts, using pivot attachments known as "Ewart attachments D or M," or their equivalent. When the pivot attachment is made with the slats near their upper edge and in the center of the width of the slats, the slats hang vertically on the pivot attachments while passing through the chamber B and while passing over the upper wheels, C C, Fig. 5. When the pivot attachment is made near the upper edge of the slats and nearer one side than the other side of the slats, the weight of the slats causes them to assume an inclined or angular position while passing through the chamber B, and while passing over the upper wheels, C C, as shown in Fig. 6. By thus attaching the chains or belts to the slats *e e*, at or near the upper edge of the slats and nearer one side of the slats than the other side, and causing the slats to assume an inclined position, the single or the compound slats may be more closely and compactly placed together on the chains or belts, for when passing over the upper wheels, C C, in this position they interfere less with each other than is the case when they hang vertically, as shown in Fig. 6, and allow free circulation of air through the chamber B better than when they assume a horizontal position while passing over the upper wheels, C C.

Instead of constructing the compound surface-multiplying slats *e e* with several single strips of metal or of wood of suitable width, the single strips may themselves be composed of several narrow strips placed one above the other a slight distance apart from each other, these several narrow strips thus forming one single strip, and several of these compound strips may then be connected together, thus forming a compound surface-multiplying slat. In this case the air or vapor or gas passes more freely through and around and between the strips composing the compound slats, and the liquid does not so readily flow off and away from the slats, for it drops or trickles from one strip to the next, instead of smoothly flowing. I also use a hood or cap or cover, *x*, Fig. 1, terminating in a pipe, R, on the chamber B. This pipe connects the chamber B with a condensing apparatus or worm, so that when desired the aqueous or alcoholic or other vapors which have been evaporated in the chamber B may be conducted to a condensing apparatus or worm, where they may be condensed. When evaporation only is desired, the condenser or worm is disconnected and the evaporated vapors pass out of the chamber into the open air. I also use a damper or cut-off, S, Fig. 1, in the pipe R, so that when rapid evaporation is not desired currents of air or vapor or gas may be prevented from passing through the chamber B, and a nearly-confined atmosphere may be maintained in the chamber B, or rapid currents may be allowed through the apparatus, as may be desired, according to the nature of the work to be performed. I also use the inlet-pipe T, Fig. 1, for introducing steam or sulphurous-acid gas or carbonic-acid gas or a small and easily-regulated quantity of air, or any vapor or gas, into the chamber B, according to the nature of the work to be performed. I also use a glass gage, W, Fig. 1, affixed to the basin A, for showing the depth of liquid in the basin. The liquid-conveyers D D and the chamber B may be placed upon the basin A, which may be a pan containing the liquid, and which may be heated by the heater J, Fig. 5, placed under the basin or pan A, or by steam-pipes J, placed in the basin or pan A, Fig. 4, and the liquid may thus be heated and exposed in thin films on the surfaces of the liquid-conveyers D D to the air in the chamber B. The hot liquid heats the air in the chamber, and thus induces evaporating currents of air through the apparatus. The fan M may be used to hasten the evaporation. In this case the air absorbs heat and moisture from the liquid, and the liquid derives its heat from the steam-pipes J in the basin A, Fig. 4, or from the heater J, Fig. 5, beneath the basin or pan A. In some cases this construction may be preferred, for a heater for liquids is less costly and requires less attention than an air-heater.

In operating this apparatus thus constructed for the purpose of distilling water or alcohol or other volatile substances and condensing the vapors, the liquid is placed in the basin A, Fig. 1, until the lower ends of the liquid-conveyers D D are submerged and the glass gage W shows the proper depth of liquid in the basin. Motion is given to the liquid-conveyers D D, so that their entire surfaces are uniformly wet with the liquid. The damper or cut-off S is fully opened, so that air or vapor may freely pass through the chamber B. The fan M forces a current of air which is heated by the heater J to the proper degree through the chamber B, and the evaporated vapors from the liquid are conducted by the pipe R to a condenser or worm, where they are condensed. In some cases the use of the fan M may be discontinued, as the natural draft of heated air will be sufficient. In some cases the use of the heater J may be discontinued, for currents of air driven by the fan M through the apparatus without artificial heat will be preferable.

When it is desired to evaporate the liquid in the basin A, for the purpose of concentrating the substances contained in the liquid, then the air and the evaporated vapors are not conducted to the worm or condenser, but the pipe R is disconnected from the condenser and the vapors pass freely out of the chamber B.

When it is desired to expose large surfaces of liquid to air for the purposes of fermentation, or to the action of any vapor or gas for the purpose of forming solutions or to cause chemical action and form new compounds, then the use of the fan M is discontinued, and the damper S is closed, thus preventing evaporation and causing a nearly-confined atmosphere of air or vapor or gas in the chamber B, and in this case the air or vapor or gas acts chemically on the large wet surfaces of the liquid-conveyers D D, forming compounds.

When it is desired to use this apparatus to cool sirups or other hot liquids, the use of the heater J is discontinued, the damper S is fully opened, the hot liquid is placed in the basin A, the liquid-conveyers D D are set in motion, and the thin films of hot liquid on the surfaces of the liquid-conveyers D D heat the air in the chamber B, and induce cooling and also evaporating currents of air through the apparatus, which rapidly cool the liquid. The fan M may also be used to hasten the cooling process.

In a sugar or sirup factory this apparatus thus constructed may be used for the following purposes: first, to evaporate water from cane-juice by air at comparatively low temperatures; second, to form sulphurous acid solution used in bleaching raw juice; third, to form bisulphite of lime, also used in clarifying cane-juice; fourth, to carbonate the liquid for the purpose of removing lime previously used in defecating the liquid; fifth, to ferment the waste liquors, cistern bottoms, &c., and produce alcohol or vinegar; sixth, to evaporate the alcoholic liquids and condense the alcoholic vapors thus obtained in a condenser or worm; seventh, to rapidly cool hot liquids, and also evaporate them, using currents of cold air.

What I claim, and desire to secure by Letters Patent, is—

1. In a liquid-conveyer, single slats attached to the chains or belts by pivot attachments and hanging vertically while passing through the chamber and over the upper wheels, as set forth.

2. In a compound-slat liquid-conveyer, the compound surface-multiplying slats, consisting of several single strips of metal or of wood of suitable width and placed parallel to each other a proper distance apart, to allow gas or vapor or air to circulate between them, with collars or equivalent between them and attached to the chains or belts by pivot attachments near their upper edge and in the center of their width, so as to hang vertically while passing through the chamber and while passing over the upper wheels, as set forth.

3. In an apparatus for exposing large surfaces of liquid in thin fibers to air, gas, or vapor, the combination of a series of blades and endless bands or chains, the said blades being hinged or attached at one edge only to said chains, substantially as and for the purposes described.

4. The combination, with a chamber, B, of endless belts bearing blades, which are attached to the belts at their edges, as described.

5. The combination, with a drying or evaporating chamber, of a series of connected blades pivoted or fixed by their edges to endless belts, as described.

6. The combination, in an evaporator, of a series of blades or slats, linked together and depending from their points of attachment in such manner that they shall consecutively catch the drips and at the same time allow a free circulation of air between them, as described.

7. The combination, in a desiccator, of a number of blades hinged at or near their edges to endless chains, as described, with pulleys for moving said chains, a heating-chamber, a blast-engine, and a heater, substantially as described.

8. The combination, with a drying-chamber, a hood or cap thereon having a contracted outlet provided with a damper, of a series of single or a multiple of slats hinged or otherwise connected by their edges to endless bands, substantially as and for the purposes described.

In testimony whereof I affix my signature in presence of two witnesses.

ALBERT A. DENTON.

Witnesses:
  ORLO HUBBARD,
  SAMUEL DEAN.